United States Patent [19]

Morse

[11] 4,454,497

[45] Jun. 12, 1984

[54] AUTOMOBILE BRAKE PEDAL CONTROL

[76] Inventor: John F. Morse, 1699 Hines Hill Rd., Hudson, Ohio 44236

[21] Appl. No.: 340,383

[22] Filed: Jan. 18, 1982

[51] Int. Cl.³ .......................... B60Q 1/00; G05G 1/14
[52] U.S. Cl. ................... 340/52 R; 340/52 B;
340/69; 188/285; 74/474; 74/478.5; 74/594.5;
200/86.5; 116/58 R; 303/1
[58] Field of Search ............... 340/52 R, 52 A, 52 B,
340/52 C, 69, 66, 71, 78; 188/271, 266, 79.5 K,
272, 285; 303/1; 74/61, 778, 790, 474, 478,
478.5, 512, 514, 562.5, 573 R, 573 F, 589, 594.4,
594.5, 603; 200/86.5, DIG. 35; 116/58 R;
180/333; 280/289 R, 294

[56] References Cited

U.S. PATENT DOCUMENTS

| 2,836,990 | 6/1958 | Heer | 74/478.5 |
| 3,766,342 | 10/1973 | Stadelmann | 340/69 |
| 4,356,471 | 10/1982 | Nienaber | 340/52 R |

Primary Examiner—Donnie L. Crosland
Attorney, Agent, or Firm—Renner, Kenner, Greive & Bobak

[57] ABSTRACT

A counterbalancing mechanism for applying an upward force to the brake pedal (37) operable by the left foot of the driver of an automobile, comprising an actuator rod (66) transmitting force from a pressure-actuated diaphragm (74) to said pedal (37) to counterbalance the effective weight of the driver's left foot and leg when resting on said pedal (37), the pressure applied to said diaphragm (74) being adjustable by a pressure regulator (83) in the supply line (80, 89, 90) directing pressure against said diaphragm (74).

9 Claims, 6 Drawing Figures

AUTOMOBILE BRAKE PEDAL CONTROL

TECHNICAL FIELD

The invention relates to mechanism providing the driver of an automotive vehicle with improved and constant instantaneous control of the service brakes, thereby resulting in safer performance of the vehicle.

BACKGROUND ART

In automobiles having a foot-operated clutch pedal and a manually operated gearshift lever, the clutch pedal is normally located at the left of the steering column center line for operation by the left foot, with the brake pedal at the near right of the center line and the accelerator pedal at the right of the brake pedal. The accelerator pedal and the brake pedal are operated selectively by the right foot.

In vehicles having automatic transmissions, the clutch pedal is eliminated and the brake pedal position is retained but is extended laterally to the left so that it can be operated by the left foot as well as the right. However, it is customary to operate the brake pedal with the right foot by shifting it laterally to the left from the accelerator to the brake pedal, and this shift of the right foot position has been shown to require at least one second in time, which allows the vehicle to travel about 80 feet at 55 miles per hour.

If the brake pedal is operated by the left foot instantaneously upon the occurrence of an emergency, approximately one second can be saved, greatly reducing the probability of accident, but this requires the constant presence of the left foot on the brake pedal as the normal position of the left foot on the floor beside the pedal would also require about the same one second time interval to shift the left foot onto the brake pedal. If this time interval is eliminated by having the left foot constantly positioned on the brake pedal, the resulting dragging force on the brakes causes rapid brake wear and increased fuel consumption.

DISCLOSURE OF THE INVENTION

The present invention provides mechanism to allow the driver of an automotive vehicle to drive continuously and comfortably with his left foot constantly resting on the brake pedal without dragging on the brakes, thereby eliminating the time interval required to shift either foot onto the brake pedal and enabling substantially instantaneous application of the brakes in an emergency situation.

It is an object of the invention to provide improved means operatively connected to the brake pedal to counterbalance the effective weight of the driver's left leg and foot, thus preventing brake drag or inadvertent brake application when not intended or required.

Another object is to provide improved means for adjusting the counterbalancing means to accommodate the effective weight of the left leg and foot of different drivers.

A further object is to provide improved pneumatic means for adjustably counterbalancing the effective weight of the driver's leg and foot.

A still further object is to provide signaling means operatively connected to the counterbalance means to aid in adjusting the counterbalancing means to offset the effective weight of the driver's leg and foot.

These and other objects are accomplished by the improvements comprising the present invention, a preferred embodiment of which is disclosed herein by way of example as representing the best known mode of carrying out the invention. Various modifications and changes in details of construction are comprehended within the scope of the appended claims.

PREFERRED EMBODIMENT FOR CARRYING OUT THE INVENTION

Figure 1:
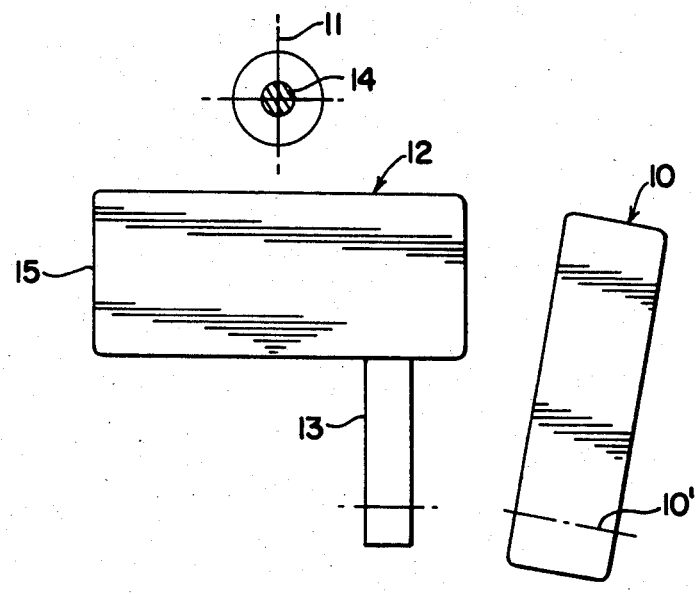
FIG. 1 is a schematic floor plan view of a conventional accelerator and brake pedal arrangement for a passenger automobile having an automatic transmission.

The schematic floor plan view of FIG. 1 shows the accelerator pedal 10 pivoted on the floorboard at 10' and positioned to the right of a longitudinal centerline 11 passing through the steering column 14. The lever arm 13 of the brake pedal 12 is located between the centerline 11 and the accelerator and has a leftward extension 15 so that it can be operated by the left foot of the driver as well as the right foot. However, it has been customary to operate the brake pedal 12 with the right foot which requires shifting the right foot from the accelerator pedal to the brake pedal.

Figure 2:
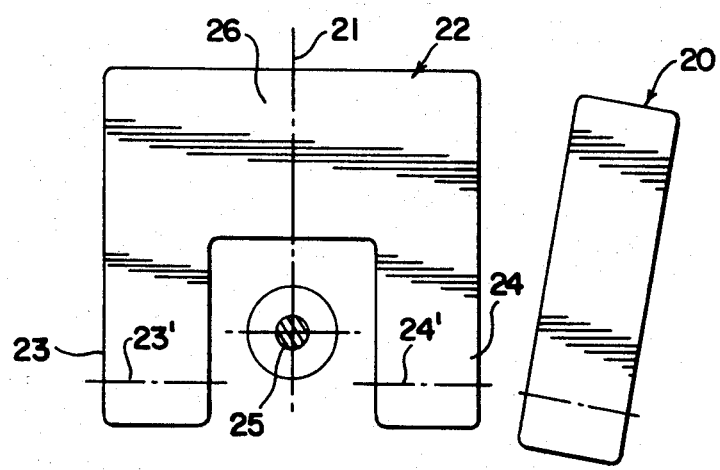
FIG. 2 is a schematic floor plan view of a conventional accelerator and brake pedal or treadle arrangement for a larger automotive vehicle such as a bus, which arrangement is adapted for application of my invention.

The schematic floor plan view of FIG. 2 has an accelerator pedal 20 located to the extreme right of the centerline 21 in the same position as pedal 10 in FIG. 1 The brake pedal is a treadle type 22, having two arms 23 and 24 straddling the steering column 25 which in this type of vehicle is more nearly vertical and thus passes through the floorboard at a point laterally opposite to the accelerator. The two arms are connected by a flange portion 26 extending laterally in front of column 25 and are pivoted on the floorboard at 23' and 24'.

Figure 3:
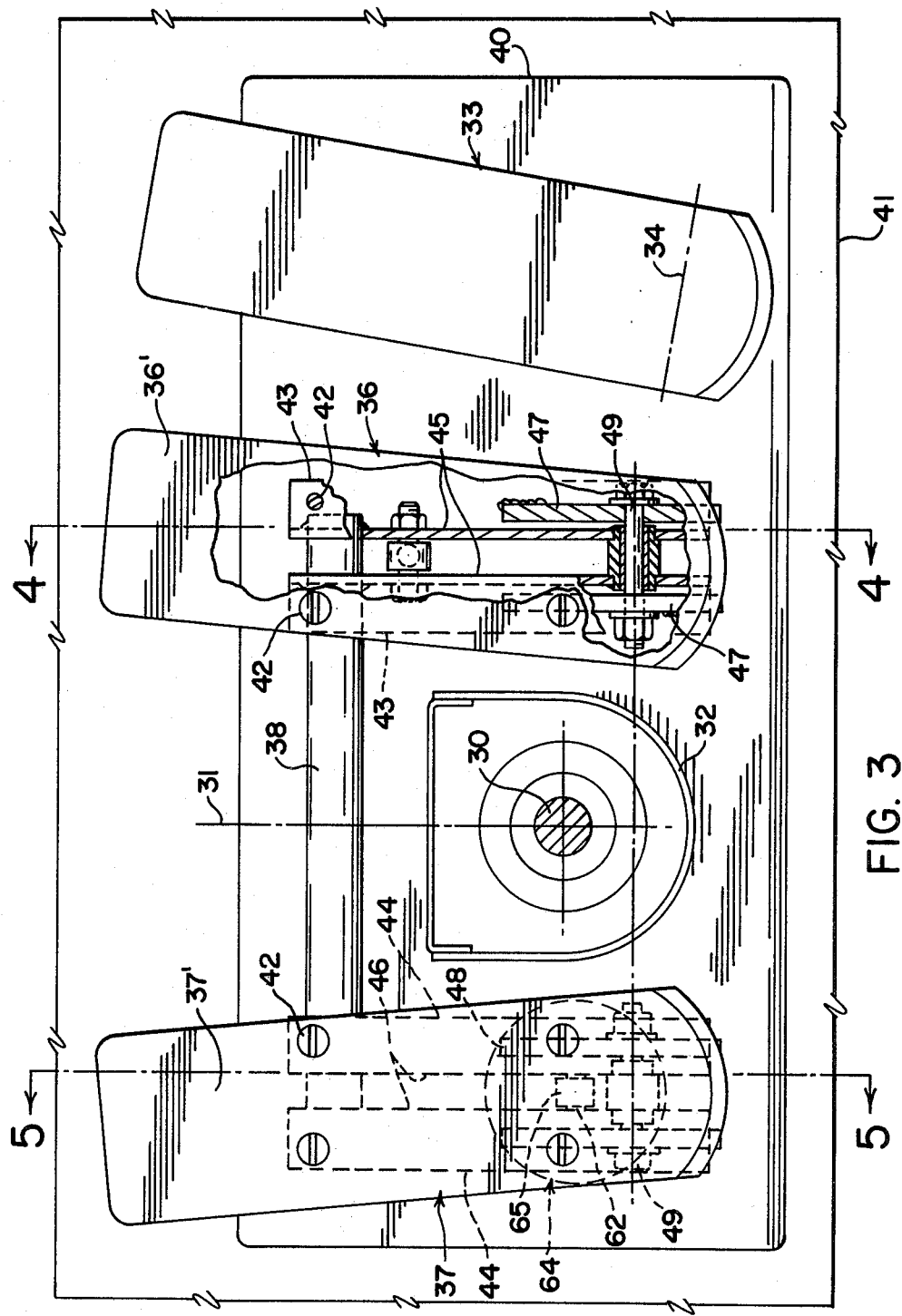
FIG. 3 is an enlarged plan view partly in section of an arrangement similar to FIG. 2, having a modified brake pedal or treadle construction embodying my invention.

In FIG. 3 the steering column 30 of a bus type vehicle is located on the longitudinal centerline 31 and enclosed in a protective shroud 32. Accelerator pedal 33 is pivoted on the floorboard on lateral axis 34 and is operatively connected to the throttle of the vehicle in a well-known manner (not shown). The brake pedal assembly or treadle comprises a right pedal 36, located between the steering column 30 and the accelerator 33, for operation by the right foot, and a left pedal 37, located to the left of steering column 30 for operation by the left foot. The two pedals are preferably rigidly connected by a tube 38 extending laterally in front of the steering column, so that both pedals move together as a unit.

Figure 4:
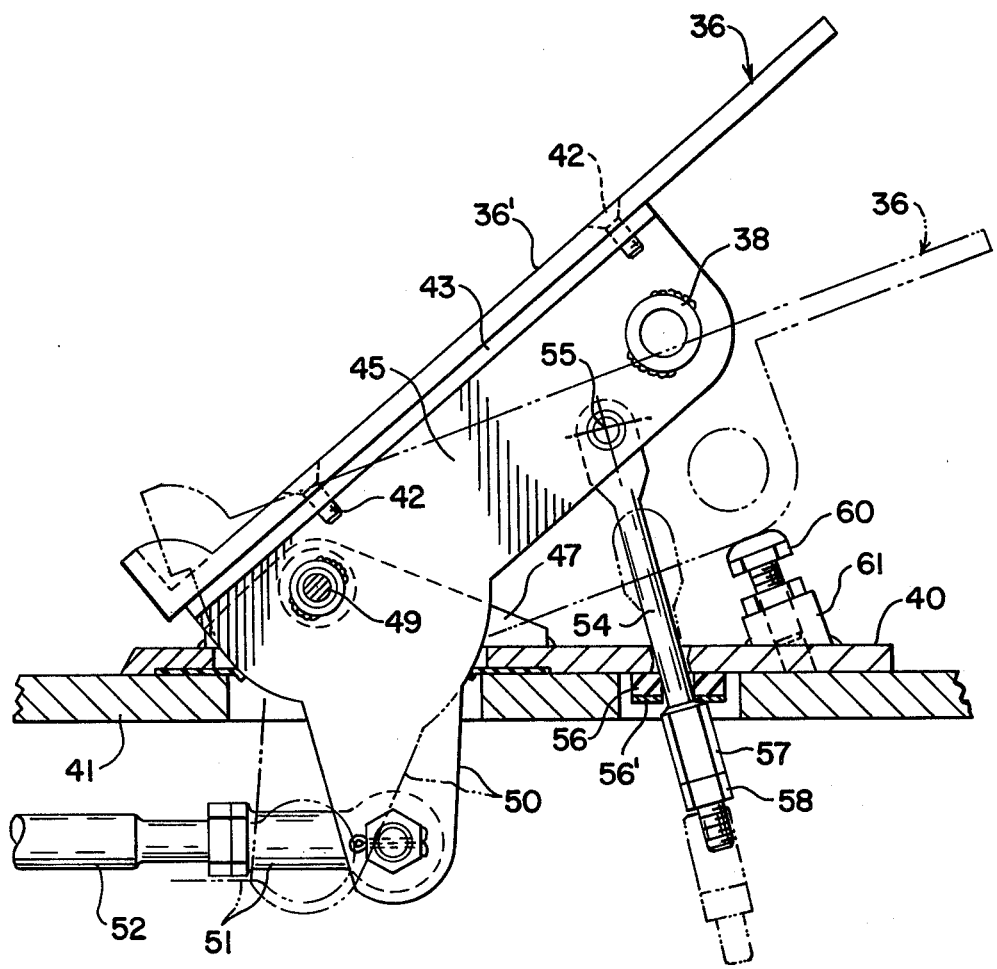
FIG. 4 is a sectional view of the right brake pedal on line 4—4 of FIG. 3.

Preferably, the accelerator pedal 33 and brake pedals 36 and 37 are pivoted on a base plate 40 which is suitably secured to the top of the floorboard 41 (FIG. 4).

The accelerator pedal 33 and brake pedals 36 and 37 may operate from an angle of 40° above horizontal down to 20°, or as may be required to apply proper motion to the control mechanism below the floor while at a comfortable angle for the driver.

The pedals 36 and 37 may have top plates 36' and 37' secured by screws 42 to substructures comprising horizontal top flanges 43 and 44 and depending ribs 45 and 46, respectively, and the rear ends of the ribs are pivoted at bolts 49 to brackets 47 and 48, respectively, which are welded to base plate 40. The ends of connector tube 38 are preferably welded into the front ends of the ribs 45 and 46.

The rear end of rib 45 has a depending lever arm 50 which extends through registering openings in the base plate 40 and floorboard 41 and is pivotally connected to a ball joint 51 for transmitting motion to the brake actuating rod 52 and thence to an air brake valve (not shown) which activates the service brakes of the vehicle. A linkage rod 54 is pivoted at 55 to the forward portion of rib 45 and extends through the base plate 40 and floorboard 41. An elastomeric shock ring 56 and wear ring 56' engirdle the rod 54 on the underside of the base plate, and a stop nut 57 held on the end of the rod by lock nut 58 normally abuts the wear plate to yieldingly limit upward motion of the treadle assembly. A stop screw 60 adjustably mounted in a boss 61 on the base plate abuts the rib 45 to limit downward travel of the treadle assembly.

Figure 5:
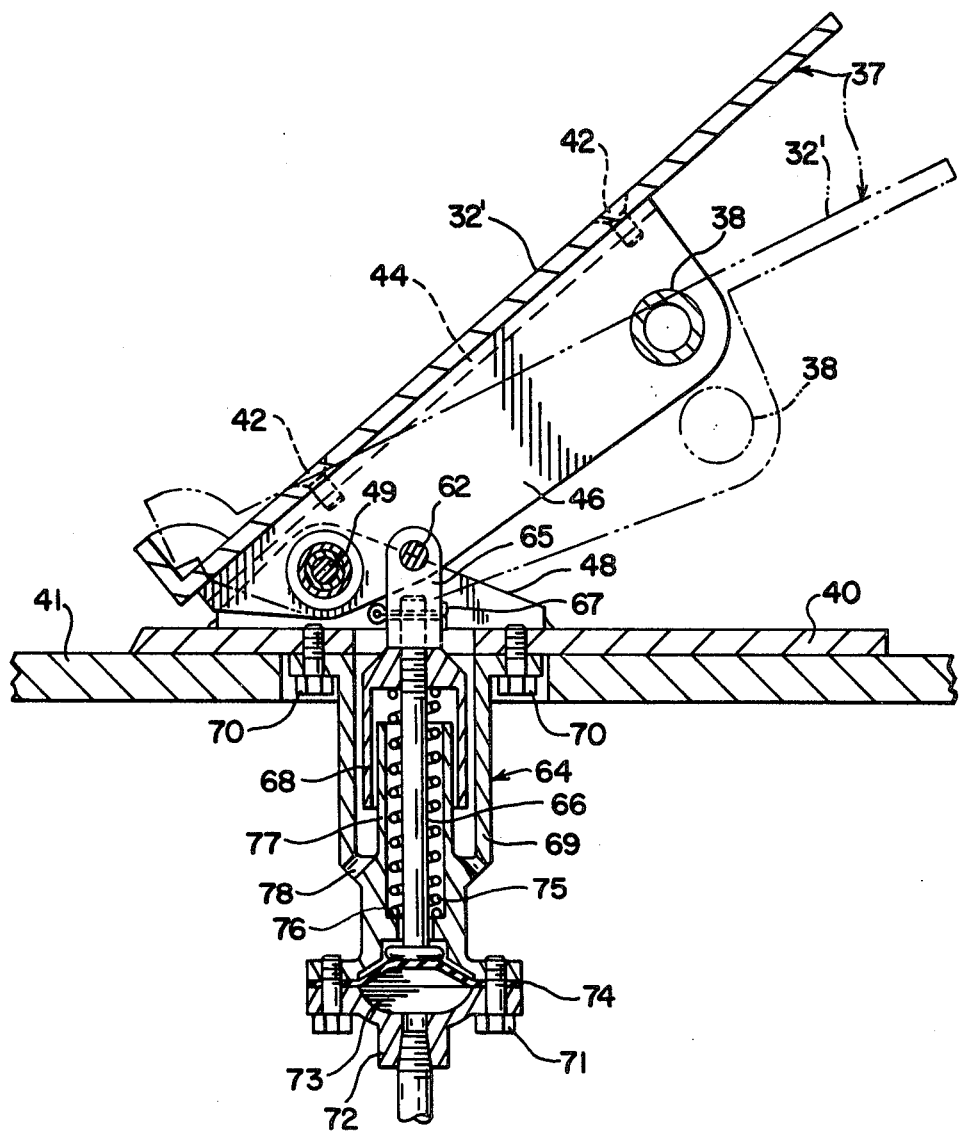
FIG. 5 is a sectional view of the left brake pedal on line 5—5 of FIG. 3.

Referring to FIG. 5, the depending rib 46 of the left brake pedal 37 is pivotally connected by drive pin 62, forwardly adjacent to bolt 49, to a preferred embodiment of the improved counterbalancing mechanism indicated generally at 64. A connector rod 65 is connected at its upper end to pin 62 and the upper end of an actuator rod 66 is screwed into rod 65 and secured by a cotter pin 67. The actuator rod 66 is threaded through an upper shroud 68 encircling actuator rod 66 and a housing 69 encloses the shroud and is secured at its upper end by screws 70 to the underside of base plate 40.

The lower end of housing 69 is secured by screws 71 to a pipe connection 72 forming a chamber 73 at the lower end of the housing, and a diaphragm 74 spans the chamber and is secured at its periphery between the housing 69 and pipe connection 72. The lower end of actuator rod 66 abuts diaphragm 74, so that when the diaphragm is subjected to air pressure from pipe connection 72 the rod will be raised to hold the brake pedal in its upper position, as shown in full lines in FIG. 5.

A helical compression spring 75 encircles actuator rod 66 and has its lower end in abutment with a shoulder 76 on housing 69 and its upper end in abutment with the top of shroud 68. A tubular guide flange 77 on the housing within the shroud 68 surrounds the spring 75 and drain holes 78 are provided in the housing at the base of flange 77 for the escape of moisture which may accumulate in the housing. The spring 75 is designed to counterbalance the weight of the treadle assembly so as to hold the brake pedals 36 and 37 in the up position when not in use and with no pressure applied to diaphragm 74.

Figure 6:
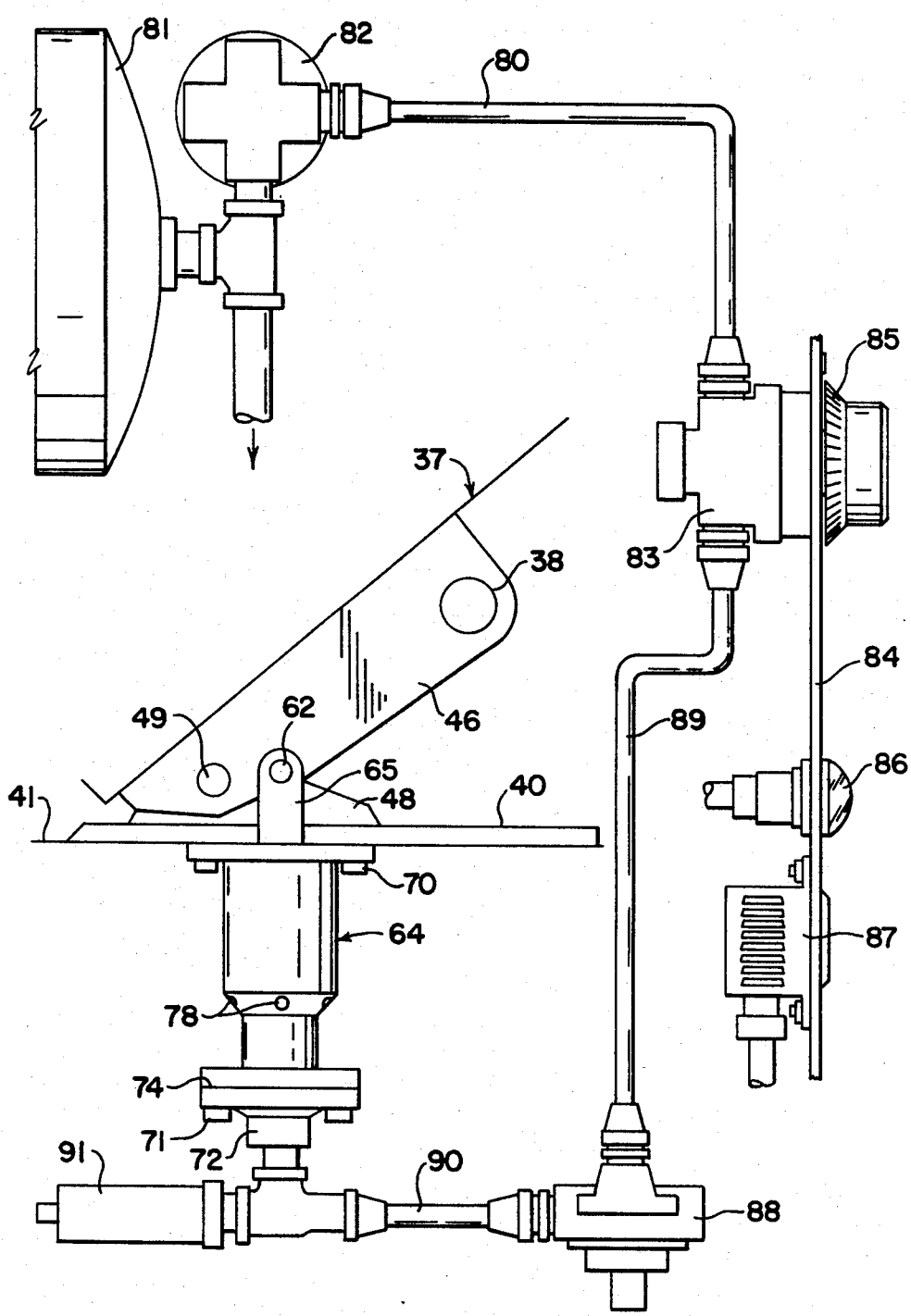
FIG. 6 is a somewhat schematic pneumatic piping layout adapted to be connected to the vehicle air brake supply tank and to the left brake pedal for counterbalancing the weight of the driver's leg and foot resting thereon.

In FIG. 6 the counterbalancing mechanism 64 is shown connected to the vehicle air brake supply. The pipe 80 is connected to the vehicle air pressure tank 81 by a regulator 82 which reduces the air pressure to an amount slightly about the maximum required by the mechanism 64, for example, about 35 psi, and the regulator 82 is fixed to deliver this desired operating pressure. Pipe 80 is connected to a variable pressue regulator 83 which is preferably mounted in a convenient location on the instrument panel 84 of the vehicle so that the driver can readily adjust the pressure supplied to counterbalancing mechanism 64 in accordance with the effective weight of his left leg and foot resting on pedal 37.

The regulator 83 is provided with a graduated scale 85 so that the driver can read the setting indicating the pressure needed to counterbalance his left leg and foot, and a signal light 86 or buzzer 87 mounted on the instrument panel 84 electrically connected in the stoplight circuit of the vehicle to indicate to the driver that the brakes are being actuated either by intentionally depressing the brake pedal or by the weight of his leg and foot exceeding the counterbalancing pressure of mechanism 64. In the latter case the driver may adjust the regulator 83 to increase the pressure to the proper amount, but not so high as to require excessive pressure on the pedal to activate the brakes.

The regulator 83 is connected through a quick release valve 88 by pipes 89 and 90 to the pipe connection 72 of the mechanism 64.

The quick release valve 88 provides for reducing air pressure in the system when the regulator 83 is set to a lower pressure position. A safety pressure release valve 91 is connected to pipe 90 beyond the connection to mechanism 64 to provide protection against excessive pressure in case of regulator failure.

In the operation of the improved system, the driver first checks the setting of regulator 83 to ascertain whether it is properly set to counterbalance the effective weight of his left leg and foot and, if not, resets it accordingly. If the driver has been driving another vehicle using his right foot to apply the brakes, and tends to do likewise occasionally, the brakes will function as usual. Whenever he desires to rest his left foot on the left pedal, he may do so without dragging on the brakes, and he is in position to depress the pedal and apply the brakes instantaneously without losing the approximate one second time interval to shift his right foot from the accelerator to the right brake pedal.

While I have shown a counterbalancing mechanism adapted to be operated by pneumatic pressure for large vehicles, it is obvious that other pressure systems such as hydraulic, electronic or mechanical may be used to carry out the objects of the invention.

I claim:

1. In an automotive vehicle having an accelerator pedal adapted for operation by the right foot of the driver and a brake pedal adapted for operation by the left foot of the driver, the improvement comprising means operably connected to said brake pedal to direct a pneumatic counterbalancing force opposing the effective weight of the driver's left leg and foot when resting on said brake pedal, pressure regulator means for adjusting the counterbalancing force, and means for signaling operation of said brake pedal in excess of said counterbalancing force.

2. In an automotive vehicle as described in claim 1, wherein the means for signaling operation of the brake pedal is operatively connected in circuit with the vehicle brake system.

3. In an automotive vehicle as described in claim 1, wherein a connecting rod is pivoted at one end to said brake pedal, and is abutted at its other end by a diaphragm actuated by said counterbalancing pneumatic pressure.

4. In an automotive vehicle as described in claim 3, wherein the means for signaling operation of the brake pedal is operatively connected in circuit with the vehicle brake system.

5. In an automotive vehicles as described in claim 1, wherein pressure counterbalances the weight of said pedal.

6. A counterbalancing mechanism for applying upward force to the brake pedal of an automobile to counterbalance the effective weight of a driver's left foot and leg when resting on said pedal, comprising an actuator rod connected at its upper end to the underside of said pedal, a pressure-actuated element abutting the lower end of said actuator rod, conduit means directing pressure against said diaphragm to raise said rod, and a pressure regulator in said conduit means for adjusting said pressure.

7. A counterbalancing mechanism as described in claim 6, wherein means is provided for signaling operation of said brake pedal to overcome said counterbalancing force.

8. A counterbalancing mechanism as described in claim 7, wherein pressure is applied to said pedal to counterbalance the weight of said pedal.

9. A counterbalancing mechanism as described in claim 6, wherein pressure is applied to said pedal to counterbalance the weight of said pedal.

* * * * *